(12) United States Patent
Huang

(10) Patent No.: US 11,507,182 B2
(45) Date of Patent: Nov. 22, 2022

(54) METHOD AND DEVICE FOR EYEBALL TRACKING OPERATION

(71) Applicant: SHANGHAI HARVEST INTELLIGENCE TECHNOLOGY CO., LTD, Shanghai (CN)

(72) Inventor: Jiandong Huang, Shanghai (CN)

(*) Notice: Subject to any disclaimer, the term of this patent is extended or adjusted under 35 U.S.C. 154(b) by 299 days.

(21) Appl. No.: 16/607,091

(22) PCT Filed: Mar. 6, 2018

(86) PCT No.: PCT/CN2018/078090
§ 371 (c)(1),
(2) Date: Oct. 21, 2019

(87) PCT Pub. No.: WO2018/192311
PCT Pub. Date: Oct. 25, 2018

(65) Prior Publication Data
US 2020/0064915 A1   Feb. 27, 2020

(30) Foreign Application Priority Data

Apr. 20, 2017   (CN) .......................... 201710260268.2

(51) Int. Cl.
| | |
|---|---|
| *G06K 9/00* | (2022.01) |
| *G06F 3/01* | (2006.01) |
| *G06T 7/20* | (2017.01) |
| *G06V 40/18* | (2022.01) |

(52) U.S. Cl.
CPC ................ *G06F 3/013* (2013.01); *G06T 7/20* (2013.01); *G06V 40/18* (2022.01); *G06T 2207/10048* (2013.01)

(58) Field of Classification Search
CPC ..... G06F 3/013; G06F 3/011; G06K 9/00597; G06T 7/20; G06T 2207/10048
See application file for complete search history.

(56) References Cited

U.S. PATENT DOCUMENTS

| | | | |
|---|---|---|---|
| 4,836,670 A * | 6/1989 | Hutchinson | A61B 3/113 396/51 |
| 6,456,262 B1 * | 9/2002 | Bell | A61B 3/113 345/472 |
| 6,943,070 B2 | 9/2005 | Yang | |
| 9,269,737 B1 * | 2/2016 | O'Rourke | H01L 27/14643 |
| 2012/0219176 A1 * | 8/2012 | Guan | G06K 9/00355 382/103 |

(Continued)

FOREIGN PATENT DOCUMENTS

CN    204808361    11/2015

*Primary Examiner* — Solomon G Bezuayehu

(57) ABSTRACT

The present invention provides a method and a device for eyeball tracking operation. By providing a sensing unit under the eyeball recognition region of the display unit, compared with the structure in which the camera is disposed at the edge position independently of the display screen, the sensing unit of the present invention can emit infrared light or detect infrared light signals reflected by the human eye, so as to timely capture the user's eyeball activity. The information is compared with the presetting eyeball activity information, and the operation instruction corresponding to the eyeball activity information is executed, so that the user can quickly control the device through the eyeball activity, thereby effectively improving the user experience.

18 Claims, 5 Drawing Sheets

(56) References Cited

U.S. PATENT DOCUMENTS

| | | | |
|---|---|---|---|
| 2014/0166850 A1* | 6/2014 | Zheng | G09G 3/3406 |
| | | | 250/205 |
| 2014/0368508 A1* | 12/2014 | Kunchakarra | G09G 5/395 |
| | | | 345/428 |
| 2015/0309565 A1* | 10/2015 | Beri | G06T 3/0025 |
| | | | 715/776 |
| 2016/0224106 A1* | 8/2016 | Liu | G06F 3/013 |
| 2017/0160799 A1* | 6/2017 | Shi | G06F 3/0484 |
| 2017/0318019 A1* | 11/2017 | Gordon | H04L 9/3226 |
| 2018/0196511 A1* | 7/2018 | Chae | A61B 5/16 |
| 2019/0021589 A1* | 1/2019 | Sirigu | G06F 3/013 |
| 2019/0377477 A1* | 12/2019 | Haist | G02B 27/0093 |

\* cited by examiner

METHOD AND DEVICE FOR EYEBALL TRACKING OPERATION

FIELD OF THE DISCLOSURE

The present invention relates to the field of electronic device control, and in particular, to a method and a device for eyeball tracking operation.

BACKGROUND OF THE INVENTION

With development of science and technology and advances in technology, touch screen displays have been widely applied in devices with human-computer interaction interfaces, such as operating screens of industrial computers, touch screens of tablet computers and smartphones and the like. However, as far as wearable electronic devices are concerned, there is still much room for improvement in human-computer interaction interface technology. Taking virtual reality or augmented reality (VR/AR) devices as an example, in order to enhance the sensory experience when users use these devices, the user's eye movements are usually combined with operational instructions, so eye tracking is one of the important human-computer interaction interface technology.

The eye tracking refers to tracking feature changes of the user's eyeball and the periphery of the eyeball to predict the user's state and needs, and respond to achieve the purpose of the user controlling the device with the eye actively or passively. At present, the VR/AR device or the camera outside the screen of the mobile device is generally used to capture the feature changes of the eyeball, because the camera outside the screen of such device is often independently disposed at the edge of the device (such as at the top of the mobile phone), deviated from the optical axis of the eyeball image, and the user's eyeball feature changes very quickly, so using the existing camera outside the screen cannot accurately and quickly capture the user's eyeball feature changes.

Taking the screen switching as an example, the camera outside the screen is currently used for eye tracking. However, the user's eyes are focused on the screen when using the device. If the user's eyeball notices the details of the different positions of the screen, the user begins to do some activity, because the accuracy of the eyeball feature information collected by the camera outside the screen that deviates from the optical axis is not high enough, or the response time is not fast enough, during this period, the screen cannot be accurately and real-time switched according to the angle of focus of the user's eyeball. Thus the screen delay brings a bad sensory experience to the user, and even causes symptoms such as dizziness and vomiting.

SUMMARY OF THE INVENTION

A technical problem to be solved by the present invention is to provide a technical solution for eyeball tracking operation to solve the human factors engineering problem such as inaccurate tracking angle of the user's eyeball, long-term delays, inability to respond operational instructions quickly, and poor user's sensory experience. The problem mentioned above is caused by the camera outside the screen that deviates from the optical axis and the feature information of the user's eyeball cannot be accurately and timely captured.

In order to solve the above technical problem, the present invention adopts the following technical solution: a method for eyeball tracking operation; the method is applied to a device for eyeball tracking operation, the device comprising a display unit and a sensing unit; the display unit is provided with an eyeball activity recognition region, the sensing unit is located under the eyeball activity recognition region; the sensing unit includes an infrared sensing layer, and the infrared sensing layer is configured to emit infrared light when receiving the light source trigger signal, and to be in an infrared signal detecting state and receive an infrared light signal reflected by an user's eyeball to capture the eyeball activity information of the user when receiving a detection trigger signal, the method includes the following steps:

presetting operation configuration information, wherein the operation configuration information includes a correspondence between eyeball activity information and an operation instruction;

capturing the eyeball activity information of the user's eyeball activity recognition region, determining whether the captured eyeball activity information is successfully matched with the presetting eyeball activity information in the operation configuration information, and if yes executing the operation instruction corresponding to the eyeball activity information in the operation configuration information, otherwise not executing the operation instruction.

In addition, the step of "presetting operation configuration information" comprises:

receiving a setting instruction of the user and displaying the eyeball activity recognition region;

receiving an eyeball operation item selected by the user and capturing and saving the eyeball activity information of the user on the eyeball recognition region;

displaying an operation instruction identification list, the operation instruction identification list including one or more identifications corresponding to operation instructions, and each operation instruction identification corresponding to an operation instruction;

receiving a selected instruction of the operation instruction identification by the user, establishing and saving a correspondence between the operation instruction corresponding to the selected operation instruction identification and the captured eyeball activity information of the user.

In addition, the operation instruction includes one or more of text operation instructions, image operation instructions, video operation instructions, and application operation instructions.

In addition, the light source trigger signal and the detection trigger signal are alternately switched and conform to a preset frequency.

In addition, the operation instruction is a screen switching instruction, and the step of "determining whether the captured eyeball activity information is successfully matched with the presetting eyeball activity information in the operation configuration information, and if yes executing the operation instruction corresponding to the eyeball activity information in the operation configuration information, otherwise not executing the operation instruction" includes:

determining whether the captured eyeball activity information of the user matches the eyeball activity information corresponding to the screen switching instruction, and if yes, switching the screen; otherwise, the screen is not switched.

In addition, the sensing unit includes a TFT image sensing array film, the infrared sensing layer is an array formed by the infrared photodiode.

In addition, the step of "determining whether the captured eyeball activity information is successfully matched with the presetting eyeball activity information in the operation configuration information" specifically includes:

calculating a feature value according to the captured eyeball activity information of the user, and comparing with a feature value of the eyeball activity information presetting in the configuration information; when the error is less than the presetting value, it is determined to be matched, otherwise it is determined as a mismatch.

In addition, the method further includes the step of:

issuing a prompt information when it is determined that there is no eyeball activity information in the operation configuration information matching the captured eyeball activity information.

In addition, the prompt information includes one or more of sound prompt information, image prompt information, light prompt information, and video prompt information.

In addition, the display unit includes an AMOLED display screen or a LCD screen.

In addition, the display unit is the LCD screen, a backlight unit is further arranged under the sensing units; and the sensing units are arranged between the backlight unit and the LCD screen.

In addition, the eyeball activity recognition region includes a plurality of eyeball activity recognition sub-regions, and a sensing unit is disposed corresponding to each of the eyeball activity recognition sub-regions.

In addition, the device further includes a sensing unit control circuit, the method further includes:

receiving a start instruction of the user for the eyeball activity recognition sub-region, the sensing unit control circuit turning on the sensing unit under the eyeball activity recognition sub-region, and receiving a closing instruction of the user for the eyeball activity recognition sub-region, the sensing unit control circuit turning off the sensing unit under the eyeball activity recognition sub-region.

The inventor further provides a device for eyeball tracking operation. The device includes a display unit and a sensing unit; an eyeball activity recognition region is disposed on the display unit, the sensing unit is located under the eyeball activity recognition region; the sensing unit includes an infrared sensing layer, the infrared sensing layer is configured to emit infrared light when receiving the light source trigger signal, and is configured to be in an infrared signal detecting state and receive an infrared light signal reflected by the user's eyeball to capture the eyeball activity information of the user when receiving the detection trigger signal; the device further includes an operation information setting unit, a determination unit, and a processing unit;

the operation information setting unit is configured for presetting operation configuration information, the operation configuration information includes a correspondence between the eyeball activity information and the operation instruction;

the sensing unit is configured for capturing the eyeball activity information of the user on the eyeball activity recognition region, the determination unit is configured for determining whether the captured eyeball activity information is successfully matched with the preset eyeball activity information in the operation configuration information, and if yes the processing unit executes the operation instruction corresponding to the eyeball activity information in the operation configuration information, otherwise the processing unit does not execute the operation instruction.

In addition, the device further includes an operation instruction receiving unit, "the operation information setting unit is configured for presetting operation configuration information" includes:

the operation information setting unit is configured for receiving a setting instruction of the user and the display unit is configured for displaying the eyeball activity recognition region;

the operation instruction receiving unit is configured for receiving an eyeball operation item selected by the user and the sensing unit is configured for capturing and saving the eyeball activity information of the user on the eyeball recognition region;

the display unit is configured for displaying an operation instruction identification list, the operation instruction identification list including one or more identifications corresponding to operation instructions, and each operation instruction identification corresponding to an operation instruction;

the operation instruction receiving unit is further configured for receiving a selected instruction of the operation instruction identification by the user, establishing and saving a correspondence between the operation instruction corresponding to the selected operation instruction identification and the captured eyeball activity information of the user.

In addition, the operation instruction includes one or more of text operation instructions, image operation instructions, video operation instructions, and application operation instructions.

In addition, the light source trigger signal and the detection trigger signal are alternately switched and conform to a preset frequency.

In addition, the operation instruction is a screen switching instruction, and "the determination unit is configured for determining whether the captured eyeball activity information is successfully matched with the presetting eyeball activity information in the operation configuration information, and if yes executing the operation instruction corresponding to the eyeball activity information in the operation configuration information, otherwise not executing the operation instruction" includes:

the determination unit is configured for determining whether the captured eyeball activity information of the user matches the eyeball activity information corresponding to the screen switching instruction, and if yes the determination unit switches the screen; otherwise the determination unit does not switch the screen.

In addition, the sensing unit includes a TFT image sensing array film, the infrared sensing layer is an array formed by the infrared photodiode.

In addition, "the determination unit is configured for determining whether the captured eyeball activity information is successfully matched with the preset eyeball activity information in the operation configuration information" specifically includes:

the determination unit calculates a feature value according to the captured eyeball activity information of the user and compares with a feature value of the eyeball activity information presetting in the configuration information; when the error is less than the presetting value, it is determined to be matched, otherwise it is determined as a mismatch.

In addition, the processing unit is configured for issuing a prompt information when it is determined that there is no eyeball activity information in the operation configuration information matching the captured eyeball activity information.

In addition, the prompt information includes one or more of sound prompt information, image prompt information, light prompt information, and video prompt information.

In addition, the display unit includes an AMOLED display screen or a LCD screen.

In addition, the display unit is the LCD screen, a backlight unit is further arranged under the sensing units; and the sensing units are arranged between the backlight unit and the LCD screen.

In addition, the eyeball activity recognition region includes a plurality of eyeball activity recognition sub-regions, and a sensing unit is disposed corresponding to each of the eyeball activity recognition sub-regions.

In addition, the device further includes a sensing unit control circuit and an operation instruction receiving unit, the operation instruction receiving unit is configured for receiving a start instruction of the user for the eyeball activity recognition sub-region, the sensing unit control circuit is configured for turning on the sensing unit under the eyeball activity recognition sub-region, and the operation instruction receiving unit is configured for receiving a closing instruction of the user for the eyeball activity recognition sub-region, the sensing unit control circuit is configured for turning off the sensing unit under the eyeball activity recognition sub-region.

The beneficial effects of the present invention after adopting the above technical solutions are as follows. By providing a sensing unit under the eyeball recognition region of the display unit, the image projection of the user's eyeball activity formed through the optical device is located on the eyeball recognition region, and the sensing unit is disposed at or near optical axis of the eyeball image. Compared with the structure in which the camera is disposed at the edge position independently of the display screen, the sensing unit of the present invention can emit infrared light or detect infrared light signals reflected by the human eye, so as to timely capture the user's eyeball activity. The information is compared with the presetting eyeball activity information, and the operation instruction corresponding to the eyeball activity information is executed, so that the user can quickly control the device through the eyeball activity, thereby effectively improving the user experience. In addition, the sensing unit is disposed under the display unit, and the overall thickness of the mobile device can be effectively reduced compared with the structure in which the camera is protruded and disposed independently outside the region of the display screen, so that the wearable device or the mobile device is thinner and more suitable for flexible wearable devices or mobile devices, to meet the needs of the market.

DESCRIPTION OF THE PREFERRED EMBODIMENTS

Technical contents, structural features, implemented objectives and effects of the present invention will be described in detail below in combination with embodiments and with reference to the accompanying drawings.

Figure 1:
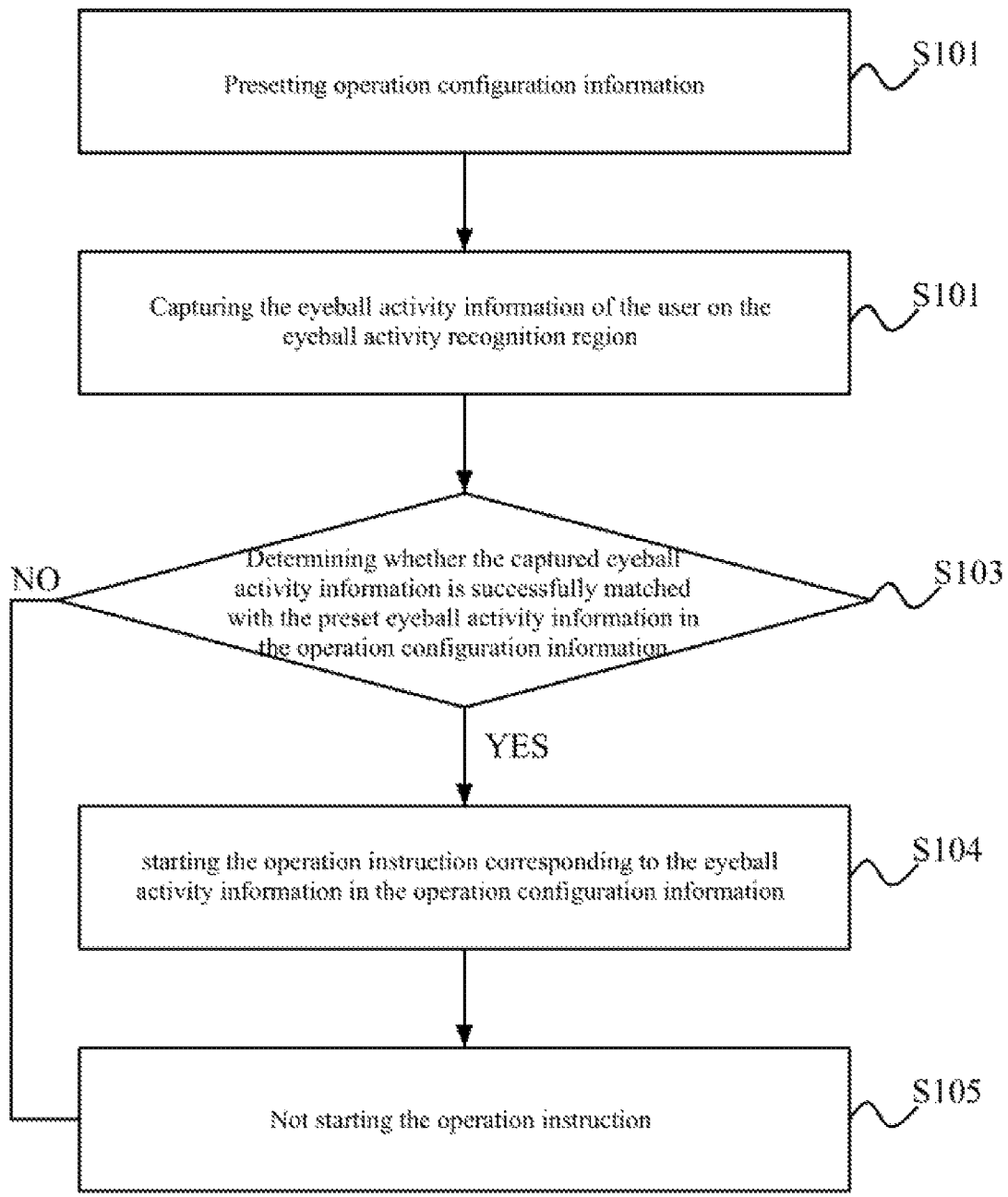
FIG. 1 is a flowchart of a method for eyeball tracking operation according to an embodiment of the present invention.
Figure 5:
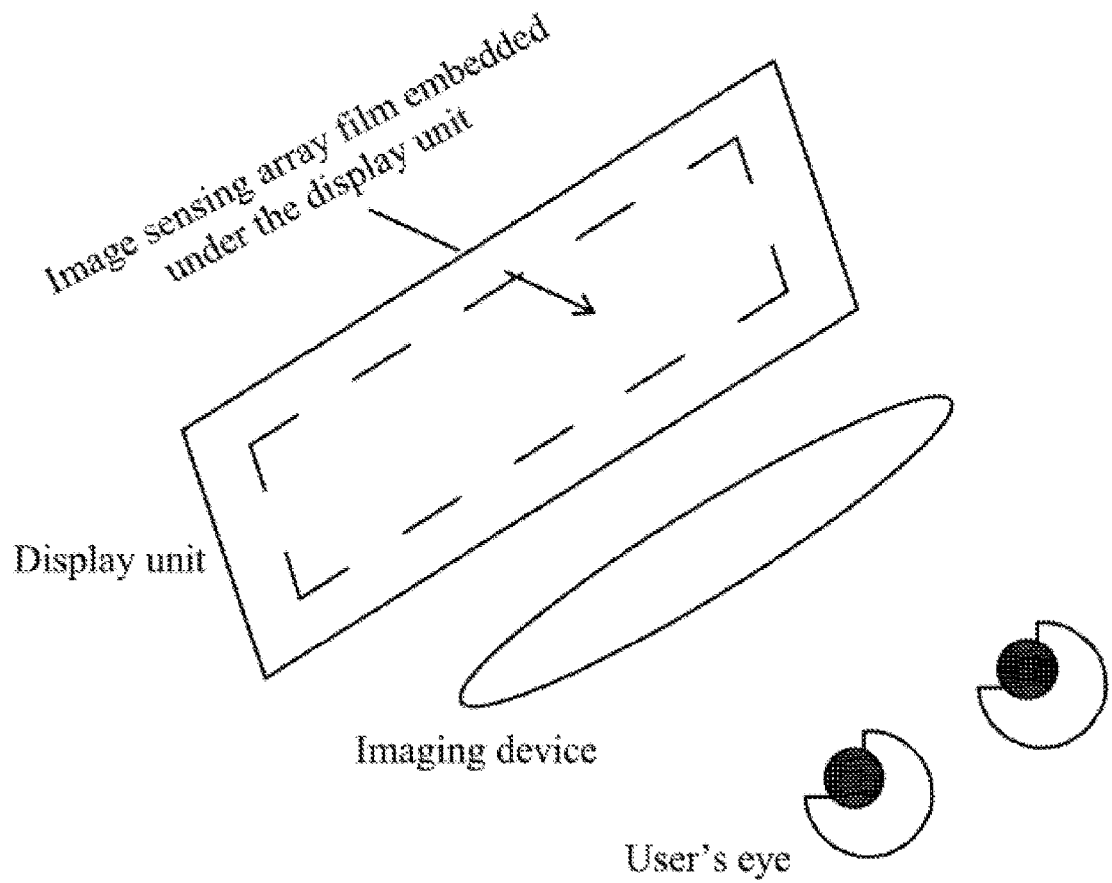
FIG. 5 is a schematic diagram of an application scenario of a device for eyeball tracking operation according to an embodiment of the present invention.

As seen from FIG. 1, it is a flowchart of a method for eyeball tracking operation according to an embodiment of the present invention. The method is applied to a device for eyeball tracking operation. The device is electronic equipment with a touch display screen, such as a mobile phone, a table computer, a personal digital assistant and other smart mobile equipment, and may also be a personal computer, a computer for industrial equipment or other electronic equipment. Of course, the device can also be combined with an optical imaging device which is disposed between the display unit and the user's eyes. As shown in FIG. 5, the user's eyeball projection is first imaged in the optical imaging device. The projection of the image is located in the range of the eyeball activity recognition region on the display unit and is captured by the sensing unit under the eyeball activity recognition region. The effect of simulating VR/AR device can be achieved by the cooperation between the optical imaging device and the display unit.

The mentioned device includes a display unit and a sensing unit; the eyeball activity recognition region is disposed on the display unit, the sensing unit is located under the eyeball activity recognition region; the sensing unit includes an infrared sensing layer, the infrared sensing layer is configured to emit infrared light when receiving the light source trigger signal, and is configured to be in an infrared signal detecting state and receive an infrared light signal reflected by the user's eyeball to capture the eyeball activity information of the user when receiving the detection trigger signal. In this embodiment, the display unit includes an AMOLED display screen or a LCD screen. The method includes the following steps:

First, the process proceeds to step S101 of presetting operation configuration information, in which the mentioned operation configuration information includes a correspondence between the eyeball activity information and the operation instruction. In this embodiment, the operation instruction includes one or more of text operation instructions, image operation instructions, video operation instructions, and application operation instructions. The text operation instructions include a selected text instruction, a delete text instruction, a copy text instruction, and the like; the image operation instructions include a selected image instruction, a copy image instruction, a cut image instruction, an image deletion instruction, a switching image screen, and the like; the video operation instruction includes intercepting, pausing, saving, deleting, fast forwarding, rewinding, zooming, and volume adjustment, and the like; the application operation instructions include starting, deleting, selecting, moving, and the like of the software application (such as a mobile phone APP). The eyeball activity information may be information of movement in any direction of the eyeball, including linear motion of the user's eyes or monocular eyeball from top to bottom or from bottom to top, linear motion from left to right or from right to left; One or more rounds of movement of the eyeball clockwise or counterclockwise; the combination of linear motion and linear motion of the above-mentioned eyeball, the combination of circular motions, the combination of linear motion and circular motion, or the eye movement that any other device can sense.

The eyeball activity information in the operation configuration information is the eyeball activity information that the user inputted and stored in advance, and each eyeball activity information corresponds to an operation instruction, and each operation instruction may correspond to a plurality of eyeball activity information. The operation configuration information may be stored in a storage unit of the device, such as a memory of the mobile phone or a hard disk of the computer, and may also be stored in the storage unit of a server. When the operation configuration information needs to be captured, the device only needs to establish a communication connection with the server and then captures the prestored operation configuration information from the server. The communication connection includes a wired communication connection or a wireless communication connection.

Then, the process proceeds to a step S102 of capturing the eyeball activity information of the user on the eyeball activity recognition region. In this embodiment, the coverage of the sensing unit is matched to the size of the display unit. Preferably, the shape of the sensing unit is a rectangle, and the size of the rectangle is located at the center of the display unit, so as to ensure that the sensing unit is not deviated from the optical axis of the eyeball activity image. This ensures that as long as the user's eyes focus on the display unit, the sensing unit can collect the user's eyeball activity information in time, no matter how the user's eyeball moves.

Then, the process proceeds to a step S103 of determining whether the captured eyeball activity information is successfully matched with the preset eyeball activity information in the operation configuration information, and if yes, proceeds to a step S104 of starting the operation instruction corresponding to the eyeball activity information in the operation configuration information, otherwise proceeds to a step S105 of not starting the operation instruction. Comparison of the eyeball activity information may be implemented by an eyeball feature recognition algorithm, which may be stored in the storage unit of the device. A processor of the device will take the eyeball feature recognition algorithms in the storage unit after the sensing unit captures the eyeball activity information on the eyeball activity recognition region, and compare the captured eyeball activity information with the preset eyeball activity information in the operation configuration information to determine whether the two are matched. The eyeball feature recognition algorithms include steps of eyeball feature preprocessing, data feature extraction, feature matching, eyeball movement recognition, etc., and may be implemented by various algorithms. These algorithms are mature existing arts, have been applied to various encryption and decryption fields, and are no longer repeated herein.

Figure 2:
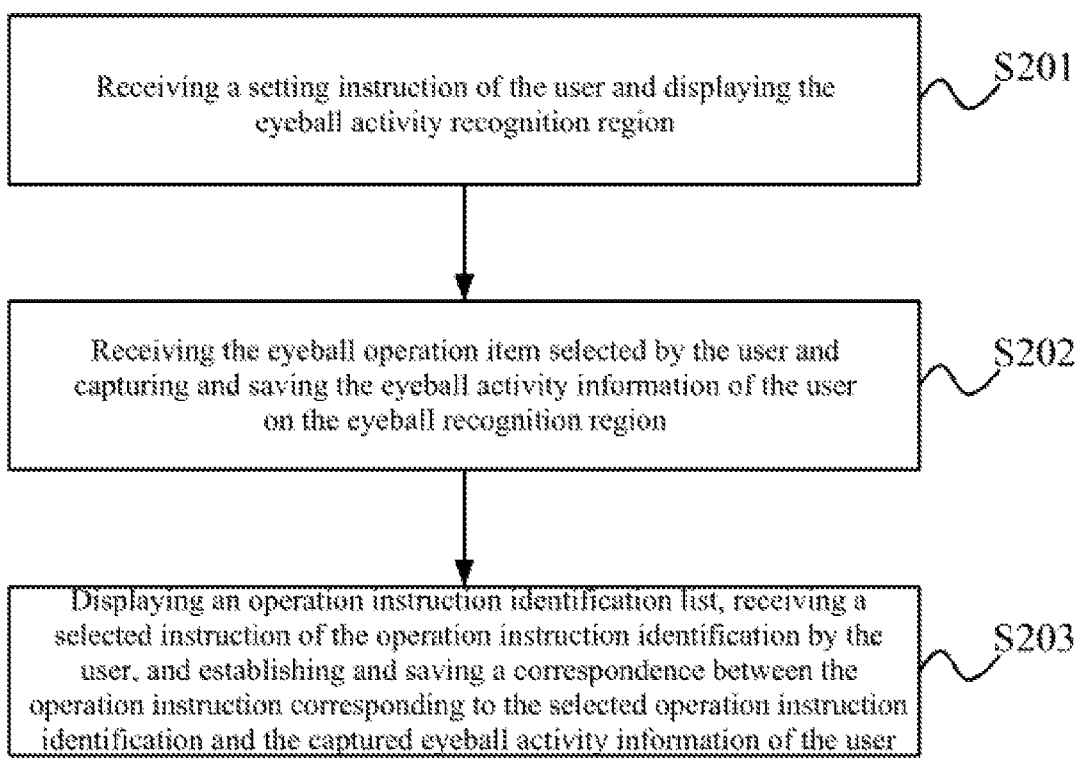
FIG. 2 is a flowchart of a method for eyeball tracking operation according to another embodiment of the present invention.

As seen from FIG. 2, it is a flowchart of a method for eyeball tracking operation according to another embodiment of the present invention. The step of "presetting operation configuration information" includes:

First, the process proceeds to a step S201 of receiving a setting instruction of the user and displaying the eyeball activity recognition region. The setting instruction may be triggered by clicking on a button in a setting column on the screen by the user. The device will display the eyeball activity recognition region after receiving the setting instruction so that the user can input the eyeball activity information. In the present embodiment, the step of displaying the eyeball activity recognition region may include: the brightness of the eyeball activity recognition region is enhanced or a prompt input box is displayed on the eyeball activity recognition region. In some embodiments, the method further includes a step of receiving account information of the user before receiving the setting instruction of the user, wherein the account information includes a user ID and a password. The setting instruction can be triggered only after the user inputs the correct user ID and password by voice control, eye control, or key password control to login a user account, so that the operation configuration information setting security can be improved on one hand, and an effect that different users can be distinguished and different eyeball activity information and the corresponding operation instruction can be saved on one device can be achieved on the other hand.

Then, the process proceeds to a step S202 of receiving the eyeball operation item selected by the user and capturing and saving the eyeball activity information of the user on the eyeball recognition region. The eyeball operation item can be the default eyeball operation item of the system or can be determined by user customization. The eyeball operation item can be presented to the user in text, image or video, allowing the user to click to select. For example, you can display "two eyeballs moving to the left at the same time", "two eyeballs moving to the right at the same time", "two eyeballs moving upwards at the same time", "two eyeballs rotate clockwise one turn" and so on for users to select. Furthermore, the eyeball operation item can be drawn into a picture or made into a tutorial video to be presented to the user so that the user can accurately select the eyeball operation item. After the eyeball operation item is confirmed, the current eyeball activity information of the user can be collected, and the collected eyeball activity information is preset eyeball activity information, which can be stored in the storage unit. In this embodiment, the step of "capturing and saving the eyeball activity information of the user on the eyeball recognition region" includes: determining whether the eyeball activity information in the user setting process has been saved in the storage unit, and prompting the user the eyeball activity information has been saved when the determination is yes; the eyeball activity information is saved to the storage unit when the determination is no. This can effectively avoid repeated storage of eyeball activity information.

Then, the process proceeds to step S203 of displaying an operation instruction identification list, receiving a selected instruction of the operation instruction identification by the user, and establishing and saving a correspondence between the operation instruction corresponding to the selected operation instruction identification and the captured eyeball activity information of the user. The operation instruction identification list includes one or more identifications corresponding to operation instructions, and each operation instruction identification corresponds to an operation instruction, and the operation instruction identification may be displayed in the form of a text or a picture. The selected instruction can be triggered by the user clicking a check, double clicking, or the like.

In order to present a better video scene to the user, the device can be combined with the VR helmet to provide a relatively closed and dark operating space, giving the user an immersive feeling. Since the visible light does not enter the human eye in dark conditions, so it is impossible to capture the optical signal reflected by the user. In this case, the infrared sensing layer of the sensing unit of the present invention emit infrared light when receiving the light source trigger signal, so that the user's eyeball activity can also be detected under relatively closed and dark conditions. At the same time, the infrared sensing layer is still in the infrared signal detecting state when receiving the detection trigger signal, and receives the infrared light signal reflected by the user's eyeball to capture the user's eyeball activity information.

Figure 6:
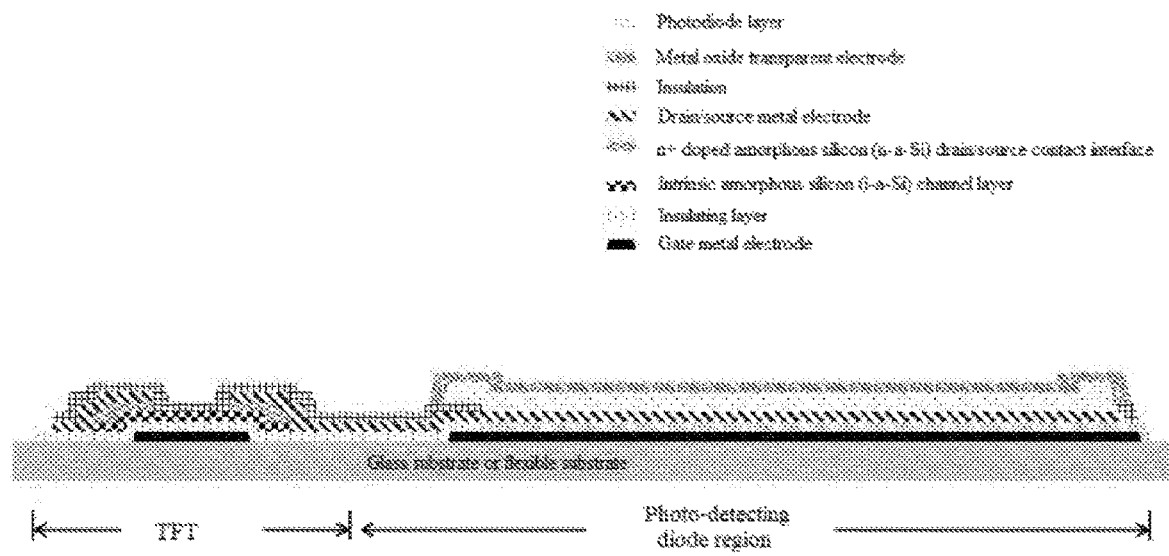
FIG. 6 is a schematic diagram of a conventional sensing unit.

As shown in FIG. 6, in the present embodiment, each sensing unit includes a TFT image sensing array film. An LCD screen or an OLED display screen is driven by a TFT structure to scan a single pixel to realize a display function of a pixel array on the panel. A main structure for forming a TFT switching function is an MOSFET, wherein well-known semiconductor layer materials mainly include amorphous silicon, polycrystalline silicon, IGZO, organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 6). A specific structure may refer to descriptions on the structure of the sensing unit in a U.S. Pat. No. 6,943,070B2 and a PRC patent CN204808361U. A production process of the TFT image sensing array film is different from that of a TFT structure of the display screen in that an original pixel starting region of the display screen is changed to a photo-sensing in the production process. The TFT may be prepared by a method of using thin glass as a substrate or using a high temperature-resistant plastic material as the substrate, as described in the U.S. Pat. No. 6,943,070B2.

The sensing unit shown in FIG. 6 is susceptible to the reflection and refraction of surrounding ambient light or visible light emitted by the pixels of the display screen and other factors, causing optical interference and seriously affecting the signal-to-noise ratio (SNR) of the TFT image sensor array thin-film embedded under the display panel. In order to improve the SNR, a further improvement can be made on the sensing unit shown in FIG. 6, so that the TFT image sensor array thin-film can detect the infrared signal reflected by the user's eyeball. The sensing unit includes the infrared sensing layer, and the infrared sensing layer is configured to receive the infrared light signal reflected by the user's eyeball to capture the user's eyeball activity information.

Figure 7:
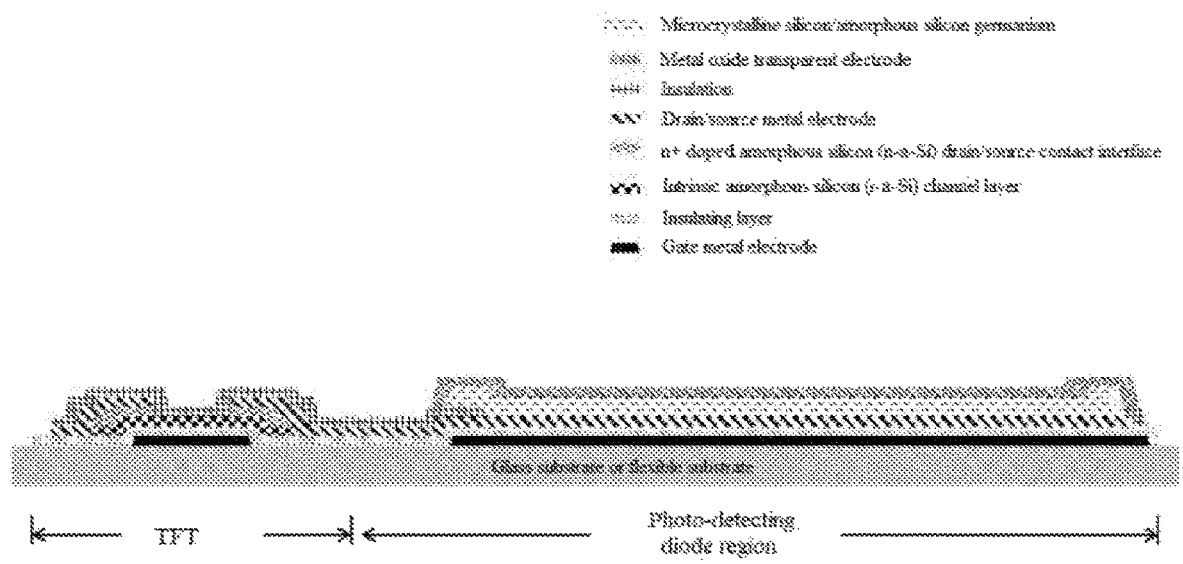
FIG. 7 is a schematic diagram of a sensing unit according to an embodiment of the present invention.

As shown in FIG. 7, the infrared sensing layer is an array formed by infrared photodiodes. In order to expand the wavelength of the optical signal that can be recognizable by the TFT image sensor array thin-film from the visible light range to the infrared light range and make the sensing unit can still capture the user's eyeball activity information when the display unit is a non-self-illuminating display screen (such as LCD display or electronic ink display), it is necessary to improve the TFT image sensor array thin-film shown in FIG. 6. The improvement is specifically to replace the photodiode layer of the TFT image sensor array thin-film shown in FIG. 6 by using an infrared photodiode, and the infrared photodiode includes a microcrystalline silicon photodiode or an amorphous silicon compound photodiode.

Embodiment 1: the amorphous silicon p-type/i-type/n-type photo diode structure (i.e., photodiode layer shown in FIG. 6) was changed to a microcrystalline silicon p-type/i-type/n-type photodiode structure. In this embodiment, the degree of micro-crystallization of the photodiode is mainly determined by mixing gaseous hydrogen silane (SiH4) with appropriate concentration of hydrogen to control the hydrogen bond to bind with the dangling bond of the amorphous silicon during the chemical vapor deposition process, so as to achieve the coating of microcrystalline silicon p-type/i-type/n-type photodiode structure. By adjusting the hydrogen concentration of chemical vapor deposition process, the operating wavelength range of the microcrystalline photodiode can be expanded to the light wavelength range of 600 nm to 1000 nm.

In the embodiment using the microcrystalline photodiode, in order to further improve the quantum efficiency of the photoelectric conversion, the microcrystalline silicon photodiode can also be formed by serially connecting double-junction or multi-junction p-type/i-type/n-type structures. The p-type/i-type/n-type material of the first junction layer of the photodiode is still an amorphous structure, and the p-type/i-type/n-type material of the second junction layer or the other junction layers may be a microcrystalline structure or a polycrystalline structure.

Embodiment 2: amorphous silicon p-type/i-type/n-type photodiode structure (photodiode layer in FIG. 5) is changed to a p-type/i-type/n-type photodiode structure doped with an amorphous silicon compound having an expandable photo-sensitive wavelength range. The amorphous silicon compound of a preferred embodiment is amorphous silicon germanium. In this embodiment, during the coating process of intrinsic layer (i type) of the photodiode by using chemical vapor deposition method, gas germane (GeH4) mixed with silane (SiH4) was introduced, so that the photosensitive range of the amorphous silicon germanium p-type/i type/n-type photodiode can reach a wavelength range of 600 nm to 1000 nm.

In the embodiment using the amorphous silicon compound photodiode, in order to improve the quantum efficiency of the photoelectric conversion, the amorphous silicon photodiode can also be formed by serially connecting double-junction or multi-junction p-type/i-type/n-type structures. The p-type/i-type/n-type material of the first junction layer of the photodiode is still an amorphous silicon structure, and the p-type/i-type/n-type material of the second junction layer or the other layers may be a microcrystalline structure, a polycrystalline structure, or a material doped with a compound having an expandable photosensitive wavelength range.

When the infrared sensing layer is an array formed by an infrared photodiode, in practical application process, a TFT was used for scanning drive and a bias voltage (including positive bias, zero bias or negative bias) was applied between the p-type/i-type/n-type photodiode, thus the infrared light emitting function of TFT image sensor array thin-film can be realized.

In some embodiments, the first trigger signal may be triggered by applying a positive bias between the p-type/i-type/n-type infrared photodiode; and the second trigger signal may be triggered by applying a zero bias or a negative bias between the p-type/i-type/n-type infrared photodiode. For example, if the array formed by the infrared photodiode is assumed to have 10 columns (assuming the number is 1 to 10), then a positive bias is applied to odd-numbered pixel arrays so that the odd-numbered columns of pixel array can emit infrared light signals, and a zero bias or a negative bias is applied to even-numbered pixel arrays, so that the even-numbered columns of pixel arrays are in the infrared light detecting state, thus capturing the infrared light reflected from the location where the user's characteristic information is located and converting the infrared light into an infrared image for output. Of course, in some embodiments, the first trigger signal may be triggered by applying a zero bias or a negative bias between the p-type/i-type/n-type infrared photodiode; and the second trigger signal may be triggered by applying a positive bias between the p-type/i-type/n-type infrared photodiode.

In some embodiments, a positive bias and a zero bias or a negative bias may be alternately applied between the p-type/i-type/n-type infrared photodiode to trigger the first trigger signal or the second trigger signal. Similarly, an array formed by the infrared photodiodes with 10 columns of pixel arrays is taken as an example, during the first period, a positive bias is applied to the p-type/i-type/n-type infrared photodiode, so that the 10 columns of pixel arrays are all in an infrared light emitting state; during the second period, a zero bias or a negative bias is applied to the p-type/i-type/n-type infrared photodiode, so that the 10 columns of pixel arrays are all in the infrared light detecting state, which is used for capturing the infrared light information reflected from the location where the user's characteristic information is located and generating a corresponding infrared image output; during the third period, a positive bias is further applied to the p-type/i-type/n-type infrared photodiode, so that the 10 columns of pixel arrays are all in the infrared light emitting state; and repeatedly alternated in the same manner. The light source trigger signal (first trigger signal) and the detection trigger signal (second trigger signal) are alternately switched and conform to a preset frequency. The time interval between adjacent periods can be set according to the actual needs. Preferably, the time interval can be set as the time required for the TFT array to drive scanning each frame of infrared photodiode array to receive at least one frame of complete image signal, that is, the preset frequency is that the switch is performed every said time interval.

In some embodiments, the operation instruction is a screen switching instruction, and the step "determining whether the captured eyeball activity information is successfully matched with the presetting eyeball activity information in the operation configuration information, and if yes executing the operation instruction corresponding to the eyeball activity information in the operation configuration information, otherwise not executing the operation instruction" includes: determining whether the captured eyeball activity information of the user matches the eyeball activity information corresponding to the screen switching instruction, and if yes, switching the screen; otherwise, the screen is not switched. Since the video stream data is composed of a plurality of frames of image screens, the method of the embodiment is also applicable to determine the video stream data.

In some embodiments, the method of eyeball tracking operation is characterized in that the step "determining whether the captured eyeball activity information is successfully matched with the presetting eyeball activity information in the operation configuration information" specifically includes: calculating the feature value according to the captured eyeball activity information of the user, and compared with the feature value of the eyeball activity information presetting in the configuration information; when the error is less than the presetting value, it is determined to be matched, otherwise it is determined as a mismatch.

In some embodiments, the method further includes the step of: issuing a prompt information when it is determined that there is no eyeball activity information in the operation configuration information matching the captured eyeball activity information. The prompt information includes one or more of sound prompt information, image prompt information, light prompt information, and video prompt information. The sound prompt information includes voice prompt information prompting the user to operate the eyeball activity item again, the image prompt information includes popup prompt information prompting the user to operate the eyeball activity item again, and the video prompt information includes animation prompt information prompting the user to operate the eyeball activity item again. The light prompt information includes changing the brightness of the screen or letting the display screen emit light of different colors.

Figure 4:
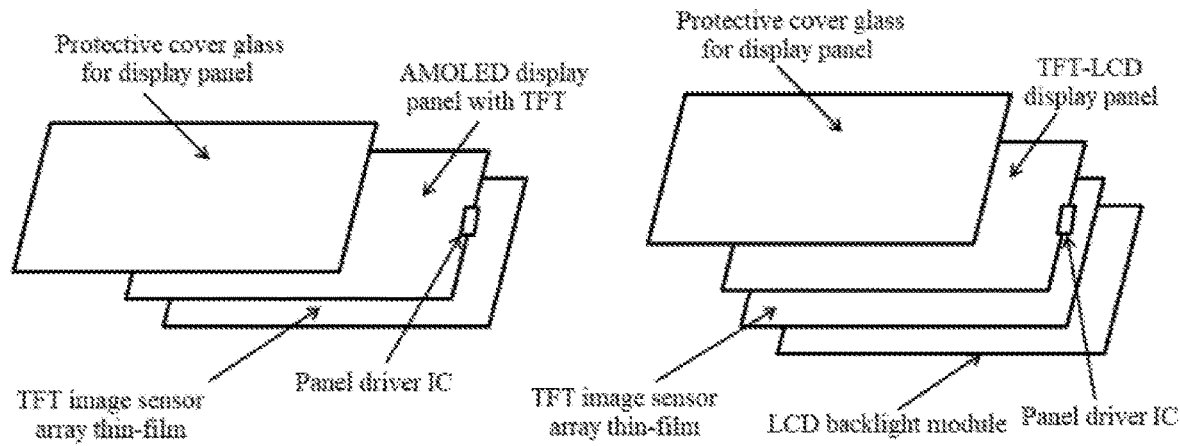
FIG. 4 is a schematic diagram of a device for eyeball tracking operation according to another embodiment of the present invention.

As shown in FIG. 4, in some embodiments, the display unit is the LCD screen, a backlight unit is further arranged under the sensing units; and the sensing units are arranged between the backlight unit and the LCD screen. Since the LCD screen is not a self-illuminating component, the backlight unit needs to be added under the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device can be expanded.

In the embodiment, the eyeball activity recognition region includes a plurality of eyeball activity recognition sub-regions, and a sensing unit is disposed corresponding to each of the eyeball activity recognition sub-regions. The device further includes a sensing unit control circuit, the method further including: receiving a start instruction of the user for the eyeball activity recognition sub-region, the sensing unit control circuit turning on the sensing unit under the eyeball activity recognition sub-region, and receiving a closing instruction of the user for the eyeball activity recognition sub-region, the sensing unit control circuit turns off the sensing unit under the eyeball activity recognition sub-region.

Taking the number of eyeball activity recognition sub-regions as two as an example, the two eyeball activity recognition sub-regions may be evenly distributed on the screen, one is up and one is down, or one is left and one is right, or may be distributed in the screen in other arrangements. The following is a detailed description of the application process of the device having two eyeball activity recognition sub-regions: in the process of using, the user sets the two eyeball activity recognition sub-regions to the on state by the start instruction. In the preferred embodiment, the range of the two eyeball activity recognition sub-regions covers the entire display screen, so that when both eyeball activity recognition sub-regions are set to the on state, the projection of the user's eyeball image is always within the range of the sensing unit, effectively improving the capture of the user's eyeball features to enhance the user experience. In other embodiments, the range of the two eyeball activity recognition sub-regions may also occupy ⅔, ¾, etc. of the entire display screen region, and only needs to satisfy the condition that the center of the eyeball activity recognition sub-region is not deviated from the optical axis of the eyeball image. Of course, the user can also set one eyeball activity recognition sub-region to be turned on and the other eyeball activity recognition sub-region to be turned off according to his or her preference. It is also possible to set both recognition sub-regions to the off state when no operation is required on the device.

In other embodiments, the number of eyeball activity recognition sub-regions may also be other values, which may be set according to actual needs. The sensing unit under each eyeball activity recognition sub-region can be set to be turned on or off according to the user's own preferences.

Figure 3:
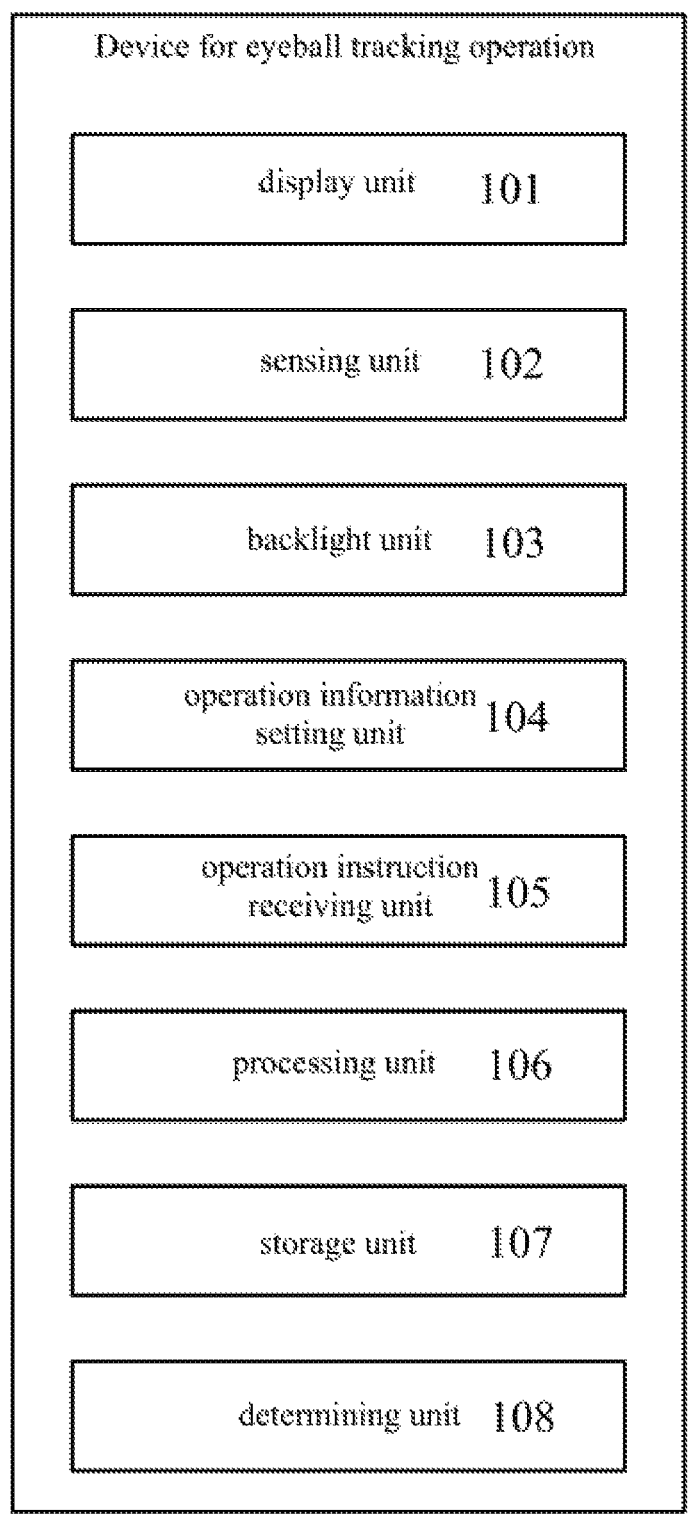
FIG. 3 is a schematic diagram of a device for eyeball tracking operation according to an embodiment of the present invention.

As seen from FIG. 3, it is a schematic diagram of a device for eyeball tracking operation according to an embodiment of the present invention. The device is electronic equipment with a touch display screen, such as a mobile phone, a table computer, a personal digital assistant and other smart mobile equipment, and may also be a personal computer, a computer for industrial equipment or other electronic equipment. Of course, the device can also be combined with an optical imaging device which is disposed between the display unit and the user's eyes. As shown in FIG. 5, the user's eyeball projection is first imaged in the optical imaging device. The projection of the image is located in the range of the eyeball activity recognition region on the display unit and is captured by the sensing unit under the eyeball activity recognition region. The effect of simulating VR device can be achieved by the cooperation between the optical imaging device and the display unit.

The mentioned device includes a display unit 101 and a sensing unit 102; the eyeball activity recognition region is disposed on the display unit 101, the sensing unit 102 is located under the eyeball activity recognition region; the sensing unit 102 includes an infrared sensing layer. The infrared sensing layer is configured to emit infrared light when receiving the light source trigger signal, and is configured to be in an infrared signal detecting state and receive an infrared light signal reflected by the user's eyeball to capture the eyeball activity information of the user when receiving the detection trigger signal. In this embodiment, the display unit includes an AMOLED display screen or a LCD screen. The device further includes an operation information setting unit 104, a determination unit 108, and a processing unit 106.

The operation information setting unit 104 is configured for presetting operation configuration information, in which the mentioned operation configuration information includes a correspondence between the eyeball activity information and the operation instruction. In this embodiment, the operation instruction includes one or more of text operation instructions, image operation instructions, video operation instructions, and application operation instructions. The text operation instructions include a selected text instruction, a delete text instruction, a copy text instruction, and the like; the image operation instructions include a selected image instruction, a copy image instruction, a cut image instruction, an image deletion instruction, a switching image screen, and the like; the video operation instruction includes intercepting, pausing, saving, deleting, fast forwarding, rewinding, zooming, and volume adjustment, and the like; the application operation instructions include starting, deleting, selecting, moving, and the like of the software application (such as a mobile phone APP). The eyeball activity information may be information of movement in any direction of the eyeball, including linear motion of the user's eyes or monocular eyeball from top to bottom or from bottom to top, linear motion from left to right or from right to left; One or more rounds of movement of the eyeball clockwise or counterclockwise; the combination of linear motion and linear motion of the above-mentioned eyeball, the combination of circular motions, the combination of linear motion and circular motion, or the eye movement that any other device can sense.

The eyeball activity information in the operation configuration information is the eyeball activity information that the user inputted and stored in advance, and each eyeball activity information corresponds to an operation instruction, and each operation instruction may correspond to a plurality of eyeball activity information. The operation configuration information may be stored in a storage unit of the device, such as a memory of the mobile phone or a hard disk of the computer, and may also be stored in the storage unit of a server. When the operation configuration information needs to be captured, the device only needs to establish a communication connection with the server and then captures the prestored operation configuration information from the server. The communication connection includes a wired communication connection or a wireless communication connection.

The sensing unit 102 is configured for capturing the eyeball activity information of the user on the eyeball activity recognition region. In this embodiment, the coverage of the sensing unit is matched to the size of the display unit. Preferably, the shape of the sensing unit is a rectangle, and the size of the rectangle is located at the center of the display unit, so as to ensure that the sensing unit is not deviated from the optical axis of the eyeball image. This ensures that as long as the user's eyes focus on the display unit, the sensing unit can collect the user's eyeball activity information in time, no matter how the user's eyeball moves.

The determination unit 108 is configured for determining whether the captured eyeball activity information is successfully matched with the preset eyeball activity information in the operation configuration information, and if yes the processing unit 106 executes the operation instruction corresponding to the eyeball activity information in the operation configuration information, otherwise the processing unit 106 does not execute the operation instruction. Comparison of the eyeball activity information may be implemented by an eyeball feature recognition algorithm, which may be stored in the storage unit of the device. A processor of the device will take the eyeball feature recognition algorithms in the storage unit after the sensing unit captures the eyeball activity information on the eyeball activity recognition region, and compare the captured eyeball activity information with the preset eyeball activity information in the operation configuration information to judge whether the two are matched. The eyeball feature recognition algorithms include steps of eyeball feature preprocessing, data feature extraction, feature matching, eyeball movement recognition, etc., and may be implemented by various algorithms. These algorithms are mature existing arts, have been applied to various encryption and decryption fields, and are no longer repeated herein.

In some embodiments, the device includes an operation instruction receiving unit 105. "The operation information setting unit is configured for presetting operation configuration information" includes:

The operation information setting unit is configured for receiving a setting instruction of the user and the display unit is configured for displaying the eyeball activity recognition region. The setting instruction may be triggered by clicking on a button in a setting column on the screen by the user. The device will display the eyeball activity recognition region after receiving the setting instruction so that the user can input the eyeball activity information. In the present embodiment, displaying the eyeball activity recognition region may include: the brightness of the eyeball activity recognition region is enhanced or a prompt input box is displayed on the eyeball activity recognition region. In some embodiments, receiving account information of the user is further included before receiving the setting instruction of the user, wherein the account information includes a user ID and a password. The setting instruction can be triggered only after the user inputs the correct user ID and password by voice control, eye control, or key password control to login a user account, so that the operation configuration information setting security can be improved on one hand, and an effect that different users can be distinguished and different eyeball activity information and the corresponding operation instruction can be saved on one device can be achieved on the other hand.

The operation instruction receiving unit is configured for receiving the eyeball operation item selected by the user and the sensing unit is configured for capturing and saving the eyeball activity information of the user on the eyeball recognition region. The eyeball operation item can be the default eyeball operation item of the system or can be determined by user customization. The eyeball operation item can be presented to the user in text, image or video, allowing the user to click to select. For example, you can display "two eyeballs moving to the left at the same time", "two eyeballs moving to the right at the same time", "two eyeballs moving upwards at the same time", "two eyeballs rotate clockwise one turn" and so on for users to select. Furthermore, the eyeball operation item can be drawn into a picture or made into a tutorial video to be presented to the user so that the user can accurately select the eyeball operation item. After the eyeball operation item is confirmed, the current eyeball activity information of the user can be collected, and the collected eyeball activity information is preset eyeball activity information, which can be stored in the storage unit. In this embodiment, the step of "capturing and saving the eyeball activity information of the user on the eyeball recognition region" includes: determining whether the eyeball activity information in the user setting process has been saved in the storage unit, and prompting the user the eyeball activity information has been saved when the determination is yes; the eyeball activity information is saved to the storage unit when the determination is no. This can effectively avoid repeated storage of eyeball activity information.

The display unit is configured for displaying an operation instruction identification list, the operation instruction receiving unit is further configured for receiving a selected instruction of the operation instruction identification by the user, and establishing and saving a correspondence between the operation instruction corresponding to the selected operation instruction identification and the captured eyeball activity information of the user. The operation instruction identification list includes one or more identifications corresponding to operation instructions, and each operation instruction identification corresponds to an operation instruction, and the operation instruction identification may be displayed in the form of a text or a picture. The selected instruction can be triggered by the user clicking a check, double clicking, or the like.

In order to present a better video scene to the user, the device can be combined with the VR helmet to provide a relatively closed and dark operating space, giving the user an immersive feeling. Since the visible light does not enter the human eye in dark conditions, so it is impossible to capture the optical signal reflected by the user. In this case, the infrared sensing layer of the sensing unit of the present invention emit infrared light when receiving the light source trigger signal, so that the user's eyeball activity can also be detected under relatively closed and dark conditions. At the same time, the infrared sensing layer is still in the infrared signal detecting state when receiving the detection trigger signal, and receives the infrared light signal reflected by the user's eyeball to capture the user's eyeball activity information.

As shown in FIG. 6, in the present embodiment, each sensing unit includes a TFT image sensing array film. An LCD screen or an OLED display screen is driven by a TFT structure to scan a single pixel to realize a display function of a pixel array on the panel. A main structure for forming a TFT switching function is an MOSFET, wherein well-known semiconductor layer materials mainly include amorphous silicon, polycrystalline silicon, IGZO, organic compounds mixed with nano carbon materials, etc. Since the structure of a photo-sensing diode can also be prepared from such semiconductor materials, and production equipment is also compatible with the production equipment of TFT arrays, a TFT photo-detecting diode has started to be produced by a TFT array preparation method in recent years. The TFT image sensing array film described in the present embodiment is the above-mentioned TFT photo-detecting diode (e.g., a photo-sensing diode region part in FIG. 6). A specific structure may refer to descriptions on the structure of the sensing unit in a U.S. Pat. No. 6,943,070B2 and a PRC patent CN204808361U. A production process of the TFT image sensing array film is different from that of a TFT structure of the display screen in that an original pixel starting region of the display screen is changed to a photo-sensing in the production process. The TFT may be prepared by a method of using thin glass as a substrate or using a high temperature-resistant plastic material as the substrate, as described in the U.S. Pat. No. 6,943,070B2.

The sensing unit shown in FIG. 6 is susceptible to the reflection and refraction of surrounding ambient light or visible light emitted by the pixels of the display screen and other factors, causing optical interference and seriously affecting the signal-to-noise ratio (SNR) of the TFT image sensor array thin-film embedded under the display panel. In order to improve the SNR, a further improvement can be made on the sensing unit shown in FIG. 6, so that the TFT image sensor array thin-film can detect the infrared signal reflected by the user's eyeball. The sensing unit includes the infrared sensing layer, and the infrared sensing layer is configured to receive the infrared light signal reflected by the user's eyeball to capture the user's eyeball activity information.

As shown in FIG. 7, the infrared sensing layer is an array formed by infrared photodiodes. In order to expand the wavelength of the optical signal that can be recognizable by the TFT image sensor array thin-film from the visible light range to the infrared light range and make the sensing unit can still capture the user's eyeball activity information when the display unit is a non-self-illuminating display screen (such as LCD display or electronic ink display), it is necessary to improve the TFT image sensor array thin-film shown in FIG. 6. The improvement is specifically to replace the photodiode layer of the TFT image sensor array thin-film shown in FIG. 6 by using an infrared photodiode, and the infrared photodiode includes a microcrystalline silicon photodiode or an amorphous silicon compound photodiode.

Embodiment 1: the amorphous silicon p-type/i-type/n-type photo diode structure (i.e., photodiode layer shown in FIG. 6) was changed to a microcrystalline silicon p-type/i-type/n-type photodiode structure. In this embodiment, the degree of micro-crystallization of the photodiode is mainly determined by mixing gaseous hydrogen silane ($SiH_4$) with appropriate concentration of hydrogen to control the hydrogen bond to bind with the dangling bond of the amorphous silicon during the chemical vapor deposition process, so as to achieve the coating of microcrystalline silicon p-type/i-type/n-type photodiode structure. By adjusting the hydrogen concentration of chemical vapor deposition process, the operating wavelength range of the microcrystalline photodiode can be expanded to the light wavelength range of 600 nm to 1000 nm.

In the embodiment using the microcrystalline photodiode, in order to further improve the quantum efficiency of the photoelectric conversion, the microcrystalline silicon photodiode can also be formed by serially connecting double-junction or multi-junction p-type/i-type/n-type structures. The p-type/i-type/n-type material of the first junction layer of the photodiode is still an amorphous structure, and the p-type/i-type/n-type material of the second junction layer or the other junction layers may be a microcrystalline structure or a polycrystalline structure.

Embodiment 2: amorphous silicon p-type/i-type/n-type photodiode structure (photodiode layer in FIG. 5) is changed to a p-type/i-type/n-type photodiode structure doped with an amorphous silicon compound having an expandable photosensitive wavelength range. The amorphous silicon compound of a preferred embodiment is amorphous silicon germanium. In this embodiment, during the coating process of intrinsic layer (i type) of the photodiode by using chemical vapor deposition method, gas germane (GeH4) mixed with silane (SiH4) was introduced, so that the photosensitive range of the amorphous silicon germanium p-type/i type/n-type photodiode can reach a wavelength range of 600 nm to 1000 nm.

In the embodiment using the amorphous silicon compound photodiode, in order to improve the quantum efficiency of the photoelectric conversion, the amorphous silicon photodiode can also be formed by serially connecting double-junction or multi-junction p-type/i-type/n-type structures. The p-type/i-type/n-type material of the first junction layer of the photodiode is still an amorphous silicon structure, and the p-type/i-type/n-type material of the second junction layer or the other layers may be a microcrystalline structure, a polycrystalline structure, or a material doped with a compound having an expandable photosensitive wavelength range.

When the infrared sensing layer is an array formed by an infrared photodiode, in practical application process, a TFT was used for scanning drive and a bias voltage (including positive bias, zero bias or negative bias) was applied between the p-type/i-type/n-type photodiode, thus the infrared light emitting function of TFT image sensor array thin-film can be realized. In some embodiments, the first trigger signal may be triggered by applying a positive bias between the p-type/i-type/n-type infrared photodiode; and the second trigger signal may be triggered by applying a zero bias or a negative bias between the p-type/i-type/n-type infrared photodiode. For example, if the array formed by the infrared photodiode is assumed to have 10 columns (assuming the number is 1 to 10), then a positive bias is applied to odd-numbered pixel arrays so that the odd-numbered columns of pixel array can emit infrared light signals, and a zero bias or a negative bias is applied to even-numbered pixel arrays, so that the even-numbered columns of pixel arrays are in the infrared light detecting state, thus capturing the infrared light reflected from the location where the user's characteristic information is located and converting the infrared light into an infrared image for output. Of course, in some embodiments, the first trigger signal may be triggered by applying a zero bias or a negative bias between the p-type/i-type/n-type infrared photodiode; and the second trigger signal may be triggered by applying a positive bias between the p-type/i-type/n-type infrared photodiode.

In some embodiments, a positive bias and a zero bias or a negative bias may be alternately applied between the p-type/i-type/n-type infrared photodiode to trigger the first trigger signal or the second trigger signal. Similarly, an array formed by the infrared photodiodes with 10 columns of pixel arrays is taken as an example, during the first period, a positive bias is applied to the p-type/i-type/n-type infrared photodiode, so that the 10 columns of pixel arrays are all in an infrared light emitting state; during the second period, a zero bias or a negative bias is applied to the p-type/i-type/n-type infrared photodiode, so that the 10 columns of pixel arrays are all in the infrared light detecting state, which is used for capturing the infrared light information reflected from the location where the user's characteristic information is located and generating a corresponding infrared image output; during the third period, a positive bias is further applied to the p-type/i-type/n-type infrared photodiode, so that the 10 columns of pixel arrays are all in the infrared light emitting state; and repeatedly alternated in the same manner. The light source trigger signal (first trigger signal) and the detection trigger signal (second trigger signal) are alternately switched and conform to a preset frequency. The time interval between adjacent periods can be set according to the actual needs. Preferably, the time interval can be set as the time required for the TFT array to drive scanning each frame of infrared photodiode array to receive at least one frame of complete image signal, that is, the preset frequency is that the switch is performed every said time interval.

In some embodiments, the operation instruction is a screen switching instruction, and "the determination unit is configured for determining whether the captured eyeball activity information is successfully matched with the preset eyeball activity information in the operation configuration information, and if yes the processing unit executes the operation instruction corresponding to the eyeball activity information in the operation configuration information, otherwise the processing unit does not execute the operation instruction" includes: the determination unit determines whether the captured eyeball activity information of the user matches the eyeball activity information corresponding to the screen switching instruction, and if yes, the processing unit switches the screen; otherwise, the processing unit not switch the screen.

In some embodiments, "the determination unit is configured for determining whether the captured eyeball activity information is successfully matched with the presetting eyeball activity information in the operation configuration information" specifically includes: the determination unit calculates the feature value according to the captured eyeball activity information of the user and compares with the feature value of the eyeball activity information presetting in the configuration information; when the error is less than the presetting value, it is determined to be matched, otherwise it is determined as a mismatch.

In some embodiments, the method further includes the step of: issuing a prompt information when it is determined that there is no eyeball activity information in the operation configuration information matching the captured eyeball activity information. The prompt information includes one or more of sound prompt information, image prompt information, light prompt information, and video prompt information. The sound prompt information includes voice prompt information prompting the user to operate the eyeball activity item again, the image prompt information includes popup prompt information prompting the user to operate the eyeball activity item again, and the video prompt information includes animation prompt information prompting the user to operate the eyeball activity item again. The light prompt information includes changing the brightness of the screen or letting the display screen emit light of different colors.

In some embodiments, the display unit is the LCD screen, a backlight unit is further arranged under the sensing units; and the sensing units are arranged between the backlight unit and the LCD screen. Since the LCD screen is not a self-illuminating component, the backlight unit needs to be added under the sensing units during installation. The backlight unit may be an LCD backlight module or other electronic components having a self-illuminating function. In some other embodiments, when the display unit is the AMOLED display screen, the backlight unit is unnecessary to be provided due to the OLED display screen is a self-illuminating component. By setting the above two solutions, production requirements of different manufacturers can be effectively met; and an application range of the device can be expanded.

In some embodiment, the eyeball activity recognition region includes a plurality of eyeball activity recognition sub-regions, and a sensing unit is disposed corresponding to each of the eyeball activity recognition sub-regions. The device further includes a sensing unit control circuit, the method further including: receiving a start instruction of the user for the eyeball activity recognition sub-region, the sensing unit control circuit turning on the sensing unit under the eyeball activity recognition sub-region, and receiving a closing instruction of the user for the eyeball activity recognition sub-region, the sensing unit control circuit turns off the sensing unit under the eyeball activity recognition sub-region.

Taking the number of eyeball activity recognition sub-regions as two as an example, the two eyeball activity recognition sub-regions may be evenly distributed on the screen, one is up and one is down, or one is left and one is right, or may be distributed in the screen in other arrangements. The following is a detailed description of the application process of the device having two eyeball activity recognition sub-regions: in the process of using, the user sets the two eyeball activity recognition sub-regions to the on state by the start instruction. In the preferred embodiment, the range of the two eyeball activity recognition sub-regions covers the entire display screen, so that when both eyeball activity recognition sub-regions are set to the on state, the image projection of the user's eyeball is always within the range of the sensing unit, effectively improving the capture of the user's eyeball features to enhance the user experience. In other embodiments, the range of the two eyeball activity recognition sub-regions may also occupy ⅔, ¾, etc. of the entire display screen region, and only needs to satisfy the condition that the center of the eyeball activity recognition sub-region is not deviated from the imaging optical axis of the eyeball image. Of course, the user can also set one eyeball activity recognition sub-region to be turned on and the other eyeball activity recognition sub-region to be turned off according to his or her preference. It is also possible to set both recognition sub-regions to the off state when no operation is required on the device.

In other embodiments, the number of eyeball activity recognition sub-regions may also be other values, which may be set according to actual needs. The sensing unit under each eyeball activity recognition sub-region can be set to be turned on or off according to the user's own preferences.

The invention has the following advantages: by providing a sensing unit under the eyeball recognition region of the display unit, the image projection of the user's eyeball activity formed through the optical device is located on the eyeball recognition region, and the sensing unit is disposed at or near optical axis of the eyeball image. Compared with the structure in which the camera is disposed at the edge position independently of the display screen. The sensing unit of the present invention can emit infrared light or detect infrared light signals reflected by the human eye, so as to timely capture the user's eyeball activity. The information is compared with the presetting eyeball activity information, and the operation instruction corresponding to the eyeball activity information is executed, so that the user can quickly control the device through the eyeball activity, thereby effectively improving the user experience. In addition, the sensing unit is disposed under the display unit, and the overall thickness of the mobile device can be effectively reduced compared with the structure in which the camera is protruded and disposed independently outside the region of the display screen, so that the wearable device or the mobile device is thinner and more suitable for flexible wearable devices or mobile devices, to meet the needs of the market.

It should be noted that, in this context, relationship terms such as first and second are used merely to distinguish one entity or operation from another entity or operation, and do not necessarily require or imply any such actual relationship or order between those entities or operations. Furthermore, the terms "include/comprise" or "contain" or any other variations are intended to encompass a non-exclusive inclusion, such that a process, method, object, or terminal device that includes a plurality of elements includes not only those elements but also other elements not explicitly listed, or includes elements inherent to such a process, method, object, or terminal device. Without further limitation, the elements defined by the sentence "including/comprising . . . " or "containing . . . " do not exclude the existence of additional elements in the process, method, object or terminal device including the elements. In addition, in this context, "greater than", "less than", "exceeds", etc. shall be construed to exclude the figure; and "above", "below", "inside", etc. shall be construed to include the figure.

Those skilled in the art shall understand that the various embodiments described above can be provided as a method, a device, or a computer program product. These embodiments may take the form of an entirely hardware embodiment, an entirely software embodiment, or a combination of software and hardware aspects. All or part of the steps in the method involved in the foregoing embodiments may be completed by instructing relevant hardware by a program, and the program may be stored in a storage medium readable by a computer device for executing all or part of the steps in the method of the foregoing embodiments. The computer device includes, but is not limited to, a personal computer, a server, a general purpose computer, a special purpose computer, a network device, an embedded device, a programmable device, a smart mobile terminal, a smart household device, a wearable smart device, a vehicle-mounted smart device, etc. The storage medium includes, but is not limited to, a RAM, a ROM, a magnetic disk, a magnetic tape, an optical disk, a flash memory, a USB flash drive, a mobile hard disk, a memory card, a memory stick, a network server storage, a network cloud storage, etc.

The above embodiments are described with reference to process flow diagrams and/or block diagrams of methods, devices (systems), and computer program products according to the embodiments. It shall be understood that each process and/or block in the process flow diagram and/or block diagram and the combination of process and/or block in the process flow diagram and/or block diagram can be realized by computer program instructions. These computer program instructions can be provided to a processor of a computer device to produce a device, such that when the instructions executed by the processor of the computer device, a device for implementing the functions specified in one or more processes in a process flow diagram and/or one or more blocks in a block diagram is produced.

These computer program instructions can also be stored in a computer device readable memory that can direct guide the computer device to operate in a particular manner, thereby enabling the instructions stored in the computer device readable memory to produce a manufacture including an instruction device, and the instruction device implements the functions specified in one or more processes in a process flow diagram and/or one or more blocks in a block diagram.

These computer program instructions can also be loaded onto a computer device, enabling a series of operating steps to be executed on the computer device to produce computer-implemented processing, and thus the instructions executed on the computer device provide steps for implementing the functions specified in one or more processes in a process flow diagram and/or one or more blocks in a block diagram.

Although the above embodiments have been described, those skilled in the art can make other changes and modifications to these embodiments once they have learned the basic inventive concept. Therefore, the above descriptions are only the embodiments of the present invention, and thus does not limit the patent protective scope of the present invention. Similarly, any equivalent structure or equivalent process transformation made by using the present specification and the drawings, or directly or indirectly applied to other relevant technical fields, shall be included in the patent protective scope of the present invention.

What is claimed is:

1. A method for eyeball tracking operation, characterized in that, the method is applied to a device for eyeball tracking operation, the device comprising a display unit and a sensing unit; the display unit is provided with an eyeball activity recognition region, the sensing unit is located under the eyeball activity recognition region; the sensing unit includes an infrared sensing layer, and the infrared sensing layer is configured to emit infrared light when receiving the light source trigger signal, and to be in an infrared signal detecting state and receive an infrared light signal reflected by an user's eyeball to capture the eyeball activity information of the user when receiving a detection trigger signal, the method includes the following steps:

presetting operation configuration information, wherein the operation configuration information includes a correspondence between eyeball activity information and an operation instruction;

capturing the eyeball activity information of the user's eyeball activity recognition region, determining whether the captured eyeball activity information is successfully matched with the presetting eyeball activity information in the operation configuration information, and if yes executing the operation instruction corresponding to the eyeball activity information in the operation configuration information, otherwise not executing the operation instruction;

wherein the step of "presetting operation configuration information" comprises:

receiving a setting instruction of the user and displaying the eyeball activity recognition region;

receiving an eyeball operation item selected by the user and capturing and saving the eyeball activity information of the user on the eyeball recognition region;

displaying an operation instruction identification list, the operation instruction identification list including one or more identifications corresponding to operation instructions, and each operation instruction identification corresponding to an operation instruction;

receiving a selected instruction of the operation instruction identification by the user, establishing and saving a correspondence between the operation instruction corresponding to the selected operation instruction identification and the captured eyeball activity information of the user.

2. The method for eyeball tracking operation according to claim 1, characterized in that, the operation instruction includes one or more of text operation instructions, image operation instructions, video operation instructions, and application operation instructions.

3. The method for eyeball tracking operation according to claim 1, characterized in that, the light source trigger signal and the detection trigger signal are alternately switched and conform to a preset frequency.

4. The method for eyeball tracking operation according to claim 1, characterized in that, the operation instruction is a screen switching instruction, and the step of "determining whether the captured eyeball activity information is successfully matched with the presetting eyeball activity information in the operation configuration information, and if yes executing the operation instruction corresponding to the eyeball activity information in the operation configuration information, otherwise not executing the operation instruction" includes:

determining whether the captured eyeball activity information of the user matches the eyeball activity information corresponding to the screen switching instruction, and if yes, switching the screen; otherwise, the screen is not switched.

5. The method for eyeball tracking operation according to claim 1, characterized in that, the sensing unit includes a thin-film transistor (TFT) image sensing array film, the infrared sensing layer is an array formed by the infrared photodiode.

6. The method for eyeball tracking operation according to claim 1, characterized in that, the step of "determining whether the captured eyeball activity information is successfully matched with the presetting eyeball activity information in the operation configuration information" specifically includes:

calculating a feature value according to the captured eyeball activity information of the user, and comparing with a feature value of the eyeball activity information presetting in the configuration information; when the error is less than the presetting value, it is determined to be matched, otherwise it is determined as a mismatch.

7. The method for eyeball tracking operation according to claim 1, characterized in that, the method further includes the step of:

issuing a prompt information when it is determined that there is no eyeball activity information in the operation configuration information matching the captured eyeball activity information.

8. The method for eyeball tracking operation according to claim 1, characterized in that, the eyeball activity recognition region includes a plurality of eyeball activity recognition sub-regions, and a sensing unit is disposed corresponding to each of the eyeball activity recognition sub-regions.

9. The method for eyeball tracking operation according to claim 8, characterized in that, the device further includes a sensing unit control circuit, the method further includes:

receiving a start instruction of the user for the eyeball activity recognition sub-region, the sensing unit control circuit turning on the sensing unit under the eyeball activity recognition sub-region, and receiving a closing instruction of the user for the eyeball activity recognition sub-region, the sensing unit control circuit turning off the sensing unit under the eyeball activity recognition sub-region.

10. A device for eyeball tracking operation, characterized in that, the device includes a display unit, and a sensing unit; an eyeball activity recognition region is disposed on the display unit, the sensing unit is located under the eyeball activity recognition region; the sensing unit includes an infrared sensing layer, the infrared sensing layer is configured to emit infrared light when receiving the light source trigger signal, and is configured to be in an infrared signal detecting state and receive an infrared light signal reflected by the user's eyeball to capture the eyeball activity information of the user when receiving the detection trigger signal; the device further includes an operation information setting unit, a determination unit, and a processing unit;

the operation information setting unit is configured for presetting operation configuration information, the operation configuration information includes a correspondence between the eyeball activity information and the operation instruction;

the sensing unit is configured for capturing the eyeball activity information of the user on the eyeball activity recognition region, the determination unit is configured for determining whether the captured eyeball activity information is successfully matched with the preset eyeball activity information in the operation configuration information, and if yes the processing unit executes the operation instruction corresponding to the eyeball activity information in the operation configuration information, otherwise the processing unit does not execute the operation instruction;

wherein the device further includes an operation instruction receiving unit, "the operation information setting unit is configured for presetting operation configuration information" includes:

the operation information setting unit is further configured for receiving a setting instruction of the user and the display unit is configured for displaying the eyeball activity recognition region;

the operation instruction receiving unit is further configured for receiving an eyeball operation item selected by the user and the sensing unit is further configured for capturing and saving the eyeball activity information of the user on the eyeball recognition region;

the display unit further is configured for displaying an operation instruction identification list, the operation instruction identification list including one or more identifications corresponding to operation instructions, and each operation instruction identification corresponding to an operation instruction;

the operation instruction receiving unit is further configured for receiving a selected instruction of the operation instruction identification by the user, establishing and saving a correspondence between the operation instruction corresponding to the selected operation instruction identification and the captured eyeball activity information of the user.

11. The device for eyeball tracking operation according to claim 10, characterized in that, the operation instruction includes one or more of text operation instructions, image operation instructions, video operation instructions, and application operation instructions.

12. The device for eyeball tracking operation according to claim 10, characterized in that, the light source trigger signal and the detection trigger signal are alternately switched and conform to a preset frequency.

13. The device for eyeball tracking operation according to claim 12, characterized in that, the operation instruction is a screen switching instruction, and "the determination unit is configured for determining whether the captured eyeball activity information is successfully matched with the presetting eyeball activity information in the operation configuration information, and if yes executing the operation instruction corresponding to the eyeball activity information in the operation configuration information, otherwise not executing the operation instruction" includes:

the determination unit is configured for determining whether the captured eyeball activity information of the user matches the eyeball activity information corresponding to the screen switching instruction, and if yes the determination unit switches the screen; otherwise the determination unit does not switch the screen.

14. The device for eyeball tracking operation according to claim 12, characterized in that, the sensing unit includes a thin-film transistor (TFT) image sensing array film, the infrared sensing layer is an array formed by the infrared photodiode.

15. The device for eyeball tracking operation according to claim 10, characterized in that, "the determination unit is configured for determining whether the captured eyeball activity information is successfully matched with the preset eyeball activity information in the operation configuration information" specifically includes:

the determination unit calculates a feature value according to the captured eyeball activity information of the user and compares with a feature value of the eyeball activity information presetting in the configuration information; when the error is less than the presetting value, it is determined to be matched, otherwise it is determined as a mismatch.

16. The device for eyeball tracking operation according to claim 10, characterized in that, the display unit is the LCD screen, a backlight unit is further arranged under the sensing units; and the sensing units are arranged between the backlight unit and the LCD screen.

17. The device for eyeball tracking operation according to claim 10, characterized in that, the eyeball activity recognition region includes a plurality of eyeball activity recognition sub-regions, and a sensing unit is disposed corresponding to each of the eyeball activity recognition sub-regions.

18. The device for eyeball tracking operation according to claim 17, characterized in that, the device further includes a sensing unit control circuit and an operation instruction receiving unit, the operation instruction receiving unit is configured for receiving a start instruction of the user for the eyeball activity recognition sub-region, the sensing unit control circuit is configured for turning on the sensing unit under the eyeball activity recognition sub-region, and the operation instruction receiving unit is configured for receiving a closing instruction of the user for the eyeball activity recognition sub-region, the sensing unit control circuit is configured for turning off the sensing unit under the eyeball activity recognition sub-region.

* * * * *